United States Patent [19]

Long

[11] 4,001,139
[45] Jan. 4, 1977

[54] LIQUID SCINTILLATION SOLUTION

[75] Inventor: Edward C. Long, Huntington Beach, Calif.

[73] Assignee: Beckman Instruments, Inc., Fullerton, Calif.

[22] Filed: Nov. 28, 1975

[21] Appl. No.: 636,383

Related U.S. Application Data

[63] Continuation of Ser. No. 541,243, Jan. 15, 1975, abandoned.

[52] U.S. Cl. .......................... 252/301.17; 250/362; 252/364
[51] Int. Cl.$^2$ ................. C09K 11/06; G01T 1/204
[58] Field of Search ..................... 252/301.17, 364; 250/362, 367

[56] References Cited

OTHER PUBLICATIONS

P. E. Stanley et al., Editors, "Liquid Scintillation Counting–Recent Developments", Academic Press, N. Y., 1974, pp. 113–124, 281–293.

*Primary Examiner*—John H. Mack
*Assistant Examiner*—Aaron Weisstuch
*Attorney, Agent, or Firm*—R. J. Steinmeyer; R. R. Meads

[57] ABSTRACT

A liquid scintillation solution which includes (1) a scintillation solvent, (2) a primary scintillation solute, (3) a secondary scintillation solute, (4) a plurality of substantially different surfactants and (5) a filter dissolving and/or transparentizing agent.

8 Claims, No Drawings

LIQUID SCINTILLATION SOLUTION

This is a continuation of application Ser. No. 541,243, filed Jan. 15, 1975, now abandoned.

This invention relates to liquid scintillation solutions and their use in liquid scintillation counting of emissions from radioactive material. Specifically this invention relates to liquid scintillation solutions which are particularly useful with radioactive samples contained on filters.

BACKGROUND OF THE INVENTION

Liquid scintillation counting is a type of analysis test which has been used for many biological research applications and is a highly efficient system for detection of low energy radiation such as $^{14}C$ and $^{3}H$. One of its primary advantages over other radiation detections systems is that the sample is placed within the detector, whereas in other systems the radioactive sample is brought only near the sample and must pass through a barrier (e.g. air or gaseous medium) which stop $^{3}H$ or $^{14}C$ emissions from reaching the detector. With liquid scintillation counting, the radiation has a better chance of being detected since it is within the detector.

In liquid scintillation counting, many biochemical experiments dictate the use of membrane filters to trap radioactive material. These filters, along with the radioactive sample, are placed in a liquid scintillation counter for radioactive detection. In the past, the use of such filters within the liquid scintillation counter has introduced problems which adversely effect the efficiency of radiation counting. First, some potential radiation counts are absorbed by the filter and not counted by the detector. Second, the radioactive material in solution is counted at a different efficiency rate than the mass of material still attached to or on the filters. It is an object of the present invention to find an answer to such problems whereby maximum efficiency of counting is realized for the radioactive samples contained on filters in liquid scintillation counters.

BRIEF SUMMARY OF THE INVENTION

The above and other problems have been solved by the present invention which contemplates a five component liquid scintillation solution. The solution can be used in a liquid scintillation counter and will either dissolve and/or transparentize the filter. By dissolving or transparentizing the filter, the radioactive counts in the sample are released from the filter and higher counting efficiency can be achieved. Further, the solution has a high counting efficiency for $^{3}H$, a strong resistance to chemiluminescence, and is capable of emulsifying biological samples such as proteins, nucleic acids and organic compounds. The solution of the present invention also performs well in refrigerated and ambient temperature counters. In particular, the present liquid scintillation solution includes (1) a scintillation solvent, (2) a primary scintillation solute, (3) a secondary scintillation solute, (4) a plurality of substantially different surfactants, and (5) a filter dissolving and/or transparentizing agent.

DETAILED DESCRIPTION OF THE PRESENT INVENTION

The following is a detailed description of the processes and reagents of the present invention. The present liquid scintillation solution outperforms any other solution now employed in a liquid scintillation counting apparatus. It differs from other prior art solubilizers in that a plurality of substantially different surfactants is employed in combination with a filter dissolving and/or transparentizing agent.

By the present invention, the liquid scintillation solvent receives energy from the emitting isotope ($^{3}H$ or $^{14}C$) in the radioactive sample. When this happens, the solvent molecules go into an excited state (i.e. the electrons go into a higher energy level). The primary solute molecule absorbs energy from the excited solvent molecules, and then re-emit energy in the form of light at a wavelength compatible with the response of a photomultiplier. The secondary solutes do the same thing, except at longer wavelengths.

Since most biological samples occur in aqueous solution and the liquid scintillation system requires an aromatic solvent, a solubilizer system (a surfactant or plurality of them) is necessary to disperse the aqueous phase in the organic phase into one homogeneous phase for counting. Without a solubilizer, organic solvents are not miscible with water. The preferred solubilizer of the present invention is a plurality of substantially different surfactants.

Further, the filter dissolving and/or transparentizing agent dissolves and/or transparentizes the membrane filter holding the radioactive sample and thus aids in releasing or breaking molecule bonds between the filter and the sample.

All of these ingredients are inert from the standpoint of chemical reactivity to each other and to the components of energy transfer which results in chemiluminescence, fluorescence or phosphorescence.

The liquid scintillation solvent is the major constituent of the present composition. The liquid scintillation solvent is used to dissolve all the other four components in the solution. Also, the solvent should be of such a purity so that it has a low background and a high counting efficiency when employed in the liquid scintillation appratus. The preferred solvents of the present invention are toluene and xylene. In this regard, toluene possesses a high ratio of counting efficiency to cost characteristic as well as non-explosive and non-toxic characteristics. The amount of solvent should be sufficient to permit interaction between the scintillation solutes and emissions from the radioactive sample on addition of the sample to the solution.

The primary solutes (also known as primary scintillation fluors) are fluorescent aromatic solutes. Preferably they are soluble in the solvent and do not interfere with the actions of the other constituents. The preferred primary scintillation solutes are PPO, that is, 2,5-Diphenyloxazole, and Butyl PBD, that is, 2,4'-t-Butylphenyl)-5-(4''-biphenyl)-1,3,4-oxidazole. The former is the most preferred because it is highly soluble, an efficient photon emitter, stable and inexpensive. The primary scintillation solutes should be present in amounts sufficient to provide countable scintillation in the solution on addition of radioactive sample to the solution. The preferred amount of PPO in the solution is 6.5–5.5 gm/liter of solution and the preferred amount of Butyl PBD is 8.5–7.5 gm/liter.

The secondary scintillation solutes (known as secondary fluors) are fluorescent aromatic solutes which have fluorescence spectra at longer wavelengths than the primary fluors. The preferred secondary liquid scintillation solutes are POPOP/1,4-Bis[2-(5-Phenyloxazoyl)]-benzene and Dimethyl POPOP/1,4-Bis[2-(4-methyl-5-phenyl-oxazoyl)]2-benezene. The amounts of secondary scintillation solute should be efficient in combination with the primary scintillation solutes to provide countable scintillation in the solution when the radioactive sample is added to solution. The preferred amounts of POPOP and Dimethyl POPOP are 0.65–0.55 gm/liter of solution.

A plurality of substantially different surfactants is needed to disperse the aqueous phase and the organic phase into one homogeneous phase for liquid scintillation counting. Substantially different surfactants is defined to mean either (1) that one surfactant is preferentially oil-soluble, while another is preferentially water-soluble, (2) that the surfactants are of different chemical families (e.g. the polar moiety of the molecule of one surfactant is a carboxyl moiety while the other is a sulfonate moiety (3) that the surfactants are of different surfactant types, e.g. one is an anionic surfactant and the other a nonionic surfactant, or (4) that one surfactant acts as a dispersant while the other acts as a surface tension reducing agent. The preferred plurality of substantially different surfactants can be found in an aqueous solubilizer system called Bio-Solv BBS-3 manufactured by Beckman Instruments, Inc. which contains molecules with a polar (soluble in water) and a non-polar group (soluble in organic phase). This system contains two different surfactants - about 50% of it is Triton X-100 (isooctyl-phenol-polyethoxyethanol) manufactured by Rohm and Haas and about the other 50% is Aerosol MA-80 (sodium dihexyl sulfosuccinate) manufactured by McKesson Chemical. The amount of the plurality of substantially different surfactants should be in an excess of the amount to render the mixture thermodynamically stable and to cause complete miscibility of organic and aqueous liquids. With Bio-Solv solubilizer, the preferred amounts are 95–105 ml/liter of scintillation solution. Further, the Bio-Solv solubilizers emulsify proteins, nucleic acids, and other organic compounds and allow use of these substances in the radioactive sample.

The filter dissolving and/or transparentizing agent used in the present invention facilitates the breaking of chemical bonds within the filter. Dissolving is defined here to mean that the membrane filter loses its physical or structural integrity and dissolves in the scintillation solution. Transparentizing is defined to mean that the membrane filter does not lose its integrity, but light can pass through it and any radioactive isotopes in contact with it will be counted at almost the same efficiency as radioactive isotopes not in contact with it, but in solution. Filters in the present invention include any common commercial membrane filters used today (e.g. Millipore and Sartorius). Normally, these are of either cellulose nitrate, cellulose acetate or mixed cellulose-nitrate/cellulose acetate composition. The present invention will readily dissolve membrane filters within 20 minutes.

The preferred filter dissolving and/or transparentizing agent are cyclic ethers. And the most preferred is tetrahydrofuran. This latter compound will dissolve cellulose nitrate and mixed cellulose nitrate/cellulose acetate filters and will transparentize cellulose acetate filters. The amount of this agent in the solution should be sufficient to carry out these functions. For tetrahydrofuran, the preferred amounts are between 95–105 ml/liter of solution.

The present scintillation solution is superior to other commercially available scintillation solutions which can be used with membrane filters for the following reasons: (a) it can count isotopes at a higher counting efficiency than others, i.e. it will count $^3H$ materials at up to 40% counting efficiency, (b) it will dissolve and/or make transparent most or all commercially available membrane filters, (c) it is not prone to an energy transfer which causes chemiluminescence, fluorescence or phosphorescence, (d) it can emulsify proteins, nucleic acids and other organic compounds which are normally present in biological samples and which will interfere with scintillation counting unless they are placed in a homogeneous phase and (e) it will have a very wide range of versatility in that it will perform in refrigerated and ambient temperature counters.

The following specific embodiment of the present invention is shown to further describe the invention in more complete terms.

EXAMPLE

The following liquid scintillation solution was prepared:

| toluene (scintillation grade) | |
|---|---|
| PPO | 6.0 gm |
| Dimethyl POPOP | .6 gm |
| Bio-Solv BBS-3 | 100 ml |
| Tetrahydrofuran | 100 ml |

The latter four components were dissolved in sufficient toluene to dissolve them and then more toluene was added to make one liter of solution.

A biological sample containing $^3H$ and on a cellulose nitrate-type composition membrane filter was added to 10.0 ml of the above scintillation solution. After 20 minutes with some shaking, the cellulose nitrate filter was completely dissolved in the solution.

The mixture was then placed in a liquid scintillation counter. It was found that the counting efficiency of the sample was between 30 and 40%.

What is claimed is:
1. A liquid scintillation solution comprising a mixture of (a) a liquid scintillation solvent, (b) a primary scintillation solute, (c) a secondary scintillation solute, (d) a plurality of substantially different surfactants, (e) a dissolving-transparentizing agent.
2. The liquid scintillation solution of claim 1 wherein the dissolving-transparentizing agent is a cyclic ether.
3. The liquid scintillation solution of claim 2 wherein the scintillation solvent is toluene.
4. The liquid scintillation solution of claim 2 wherein the primary scintillation solute is PPO.
5. The liquid scintillation solution of claim 2 wherein the secondary scintillation solute is Dimethyl POPOP.
6. The liquid scintillation solution of claim 2 wherein the plurality of substantially different surfactants are isooctylphenol-polyethoxyethanol and sodium dihexyl sulfosuccinate.
7. The liquid scintillation solution of claim 2 wherein the dissolving-transparentizing agent is tetrahydrofuran.
8. The liquid scintillation solution of claim 2 wherein the scintillation solvent is toluene, the primary scintillation solute is PPO, the secondary scintillation solute is Dimethyl POPOP, the plurality of substantially different surfactants are isooctylphenolpolyethoxyethanol and sodium dihexyl sulfosuccinate and the dissolving and/or transparentizing agent is tetrahydrofuran.

* * * * *